United States Patent [19]

Pan

[11] Patent Number: 5,711,516
[45] Date of Patent: Jan. 27, 1998

[54] SHEET FEEDER HAVING SLOPING SHEET SUPPORT SIDE FOR USE WITH DETACHABLE IMAGE SCANNER

[75] Inventor: Ampere Pan, Taipei Hsien, Taiwan

[73] Assignee: Storm Technology Inc., Mountain View, Calif.

[21] Appl. No.: 498,539

[22] Filed: Jul. 5, 1995

[51] Int. Cl.⁶ .................................. B65H 5/22
[52] U.S. Cl. ................. 271/3.14; 271/240; 271/209; 358/493; 358/496
[58] Field of Search ............... 271/3.14, 171, 271/248, 240, 209, 253; 358/473, 493, 496, 498

[56] References Cited

U.S. PATENT DOCUMENTS

| | | | |
|---|---|---|---|
| 4,298,270 | 11/1981 | Tsuda et al. | 271/248 X |
| 4,989,237 | 1/1991 | Kotani et al. | 358/473 X |
| 5,103,322 | 4/1992 | Beck et al. | 358/493 X |
| 5,330,173 | 7/1994 | Wensink et al. | 271/248 X |
| 5,384,624 | 1/1995 | Kajiwara | 271/3.14 X |
| 5,431,389 | 7/1995 | Wensink et al. | 271/248 X |
| 5,454,555 | 10/1995 | Kiyohara et al. | 271/3.14 X |

FOREIGN PATENT DOCUMENTS

| | | | |
|---|---|---|---|
| 13064 | 1/1983 | Japan | 358/498 |
| 92565 | 4/1988 | Japan | 271/3.14 |
| 310217 | 12/1990 | Japan | 271/171 |
| 16454 | 1/1992 | Japan | 271/3.14 |
| 17048 | 1/1993 | Japan | 271/171 |

*Primary Examiner*—Boris Milef
*Attorney, Agent, or Firm*—Christie, Parker & Hale, LLP

[57] ABSTRACT

The present invention is related to a sheet feeder used with an image scanner for transmitting a sheet object to be scanned through the image scanner which has a sloping plane detachably mounting thereon the image scanner and allowing the sheet object to be transmitted between the image scanner and the sheet feeder along the sloping plane for assisting in monitoring a transmission situation of the sheet object. The present invention utilizes an improvement on a sheet feeder structure to make the sheet feeder more pragmatic.

7 Claims, 3 Drawing Sheets

SHEET FEEDER HAVING SLOPING SHEET SUPPORT SIDE FOR USE WITH DETACHABLE IMAGE SCANNER

FIELD OF THE INVENTION

The present invention is related to a sheet feeder, and more particularly to an improvement for a sheet feeder structure.

BACKGROUND OF THE INVENTION

A conventional sheetfed scanner includes an image scanner 11 and a feeder 12 which optionally includes a plate 121 for placing there on a sheet object 13 to be scanned, as shown in FIG. 1. The sheet object 13 is transmitted by the feeder 12 through a passage 14 between the image scanner 11 and the feeder 12 to be scanned. The sheet object 13 is transmitted from zone A to zone B. When a user is feeding the sheet object, he had better stand or sit in zone A for easy sheet feed, and thus the image scanner will cause a visual obstacle for the user to observe the transmission situation of the sheet object. Moreover, when the sheet object is transmitted out of the sheetfed scanner, the user has to stand up and bend his body or his arm over the scanner to take the sheet object, or he need make a detour to the back of the sheetfed scanner to receive the scanned sheet object. If the user stands or sits in zone B for easily receiving the scanned object, the similar inconvenience will previously occur when the user is feeding the sheet object to be scanned.

SUMMARY OF THE INVENTION

An object of the present invention is to provide a sheet feeder which has a sloping plane for assisting in monitoring the transmission situation of a sheet object.

In accordance with the present invention, a sheet feeder adapted to be used with an image scanner for transmitting a sheet object to be scanned through the image scanner has a sloping plane detachably mounting thereon the image scanner and allowing the sheet object to be transmitted between the image scanner and the sheet feeder along the sloping plane for assisting in monitoring a transmission situation of the sheet object.

In accordance with another aspect of the present invention, the image scanner can be fixed on the sloping plane by screwing or by snap-locking.

In accordance with another aspect of the present invention, the sheet feeder preferably further includes a plate on the sloping plane for supporting the sheet object to be scanned, and two adjusting boards movably mounted on two sides of the plate for adjusting a distance therebetween according to a width of the sheet object to position the sheet object in place.

In accordance with another aspect of the present invention, a part of the sloping plate receiving the scanned sheet object is made curved for smoothly receiving the sheet object.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
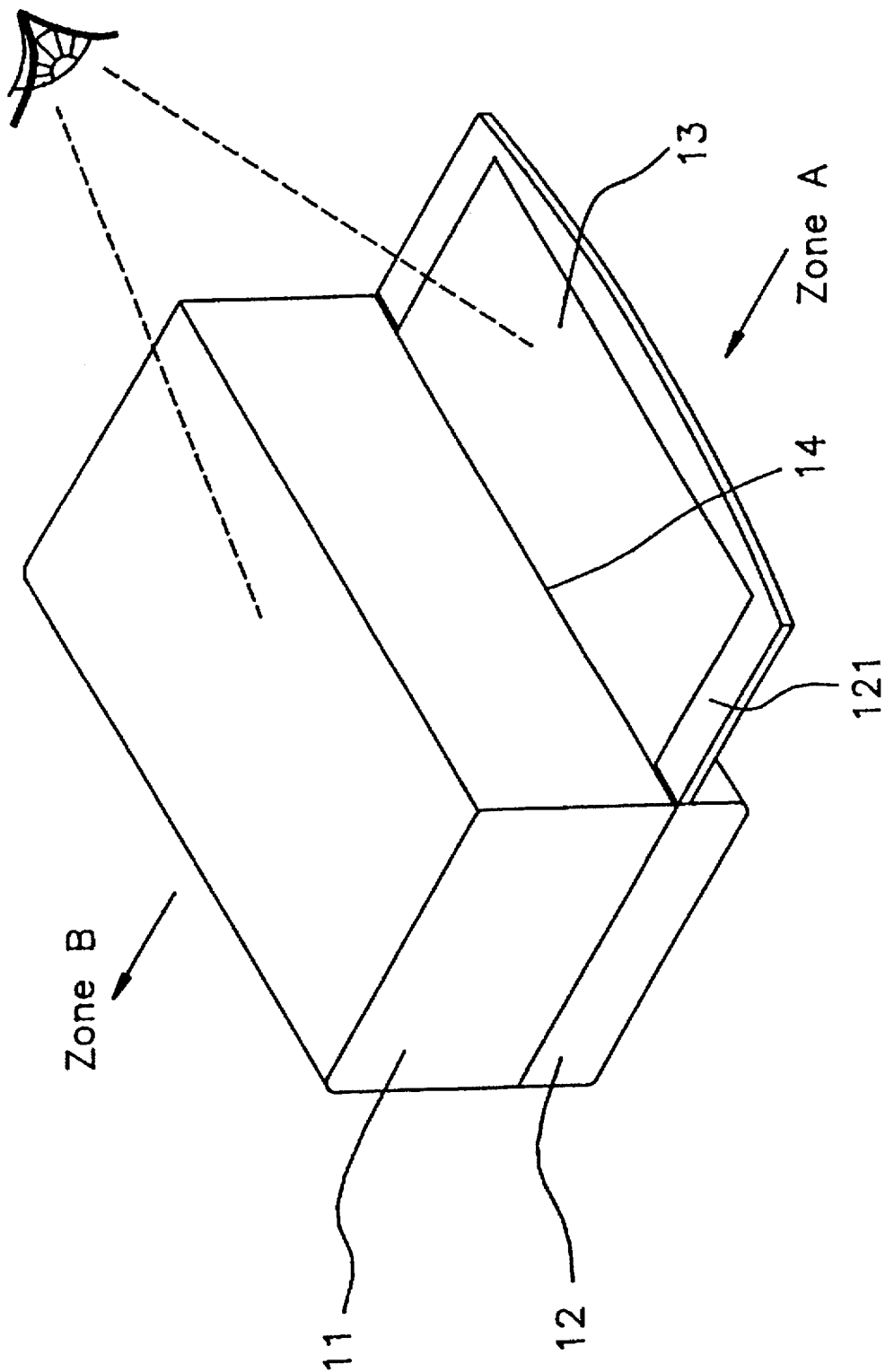
FIG. 1 is a schematic diagram showing an outward appearance of a conventional sheetfed scanner.
Figure 2:
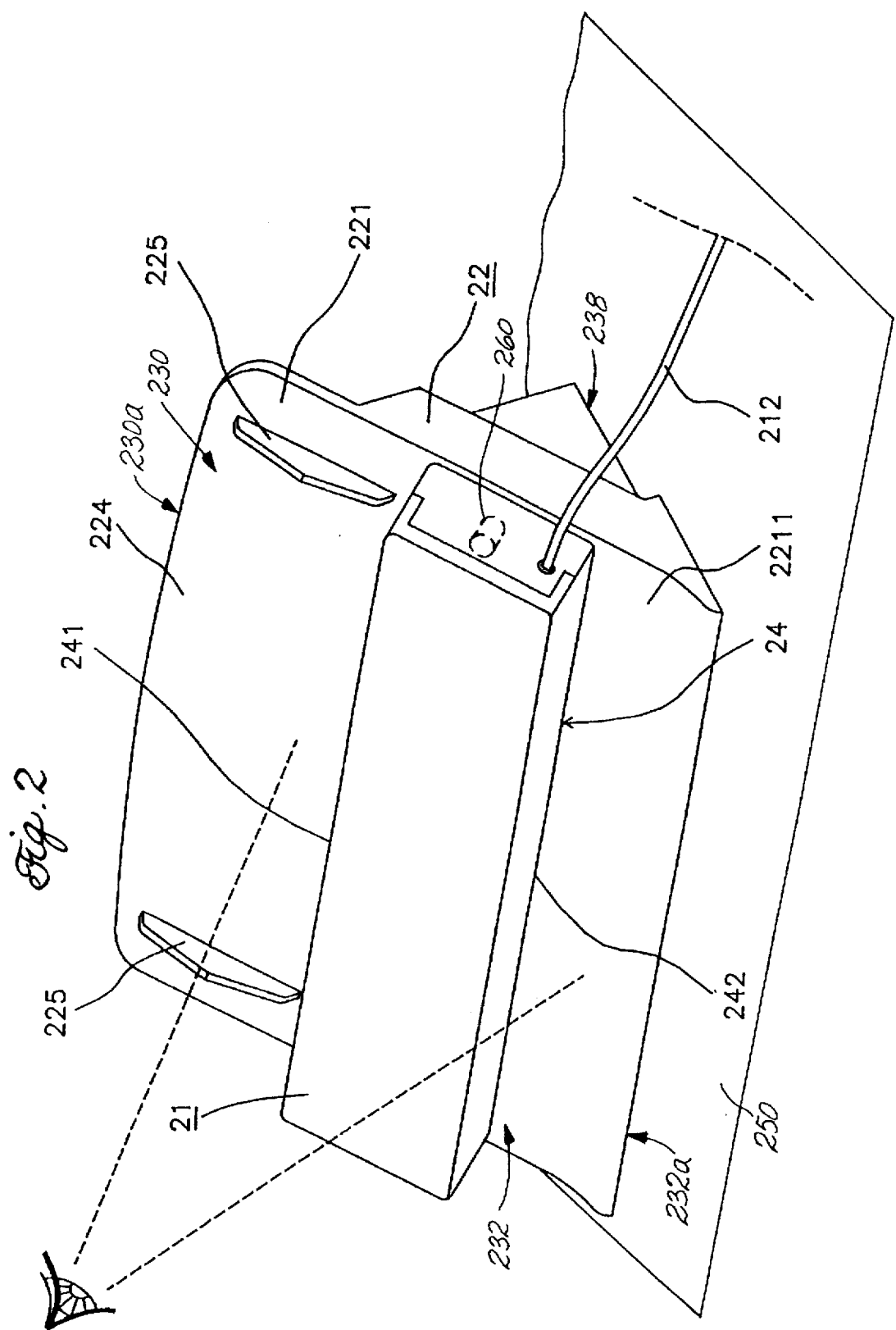
FIG. 2 is a schematic diagram showing a combination appearance of an image scanner and a preferred embodiment of a sheet feeder according to the present invention.

Please refer to FIG. 2 which is a schematic diagram showing a combination appearance of an image scanner and a preferred embodiment of a sheet feeder according to the present invention. The sheet feeder 22 is used with the image scanner 21 for transmitting a sheet object (not shown) to be scanned through a passage 24 between the image scanner 21 and the sheet feeder 22. The sheet feeder has a sloping plane or support side 221 extending between input end 230a of input zone 230 and output end 232a of output zone 232 detachably mounting thereon, extending transverse to the movement of the sheet object, the image scanner 21 and allowing the sheet object to be transmitted between the image scanner 21 and the sheet feeder 22 along the sloping plane 221 for assisting in monitoring the transmission situation of the sheet object. The sloping plane or support side 221 is located on an opposite side of the sheet feeder from a base 238 of the sheet feeder and is oriented so that the sloping plane or sloping support side 221 faces upward and slopes relative to horizontal support surface 250 on which the base 238 is placed to support the sheet feeder. Also, it is convenient for the user to stand or sit on the same side without unnecessary movement for easily feeding and receiving the sheet object.

Advantageously, the sheet feeder according to the present invention further includes a plate 224 on the sloping plane 221 for supporting the sheet object to be scanned, and two adjusting boards 225 movably mounted on opposite transverse sides of the plate, and support side 221, along which the sheet object slides, for adjusting a distance therebetween according to the width of the sheet object to position the sheet object in place. The sloping plane or support side 221 along which the sheet object slides extends from input end 230a of input zone to output end 232a of output zone 232, with output end 232a located adjacent horizontal support surface 250 on which the base portion 238 supports the sheet feeder. Furthermore, a part or portion 2211 of output zone 232 of the sloping plate 221 receiving the scanned sheet object is preferably made concave curved at end 230a with end 230a unblocked or open for smoothly receiving the sheet object and sliding the sheet object onto support surface 250.

When in use, the sheet object is placed on the plate 224 and near the entrance 241 of the passage 24 by one side thereof, and the two adjusting boards 225 are properly adjusted according to the width of the sheet object to assisting in the straight advance of the sheet object. Because the plate 224 is sloping, the sheet object will smoothly slide into the entrance 241 due to the gravity. The scanned sheet object then transmitted away from the image scanner 21 through the exit 242 of the passage 24 and falls in the part 2211 of the sloping plane 221. On the other hand, the power cable 212 of the image scanner 21 can be installed on the lateral of the scanner 21 so that it will not adversely influence the transmission of the sheet object.

Of course, the slope of the plane 221 should be evaluated according to the user's visual angle and the fictional force between the sheet object to be scanned and the sloping plane.

Figure 3:
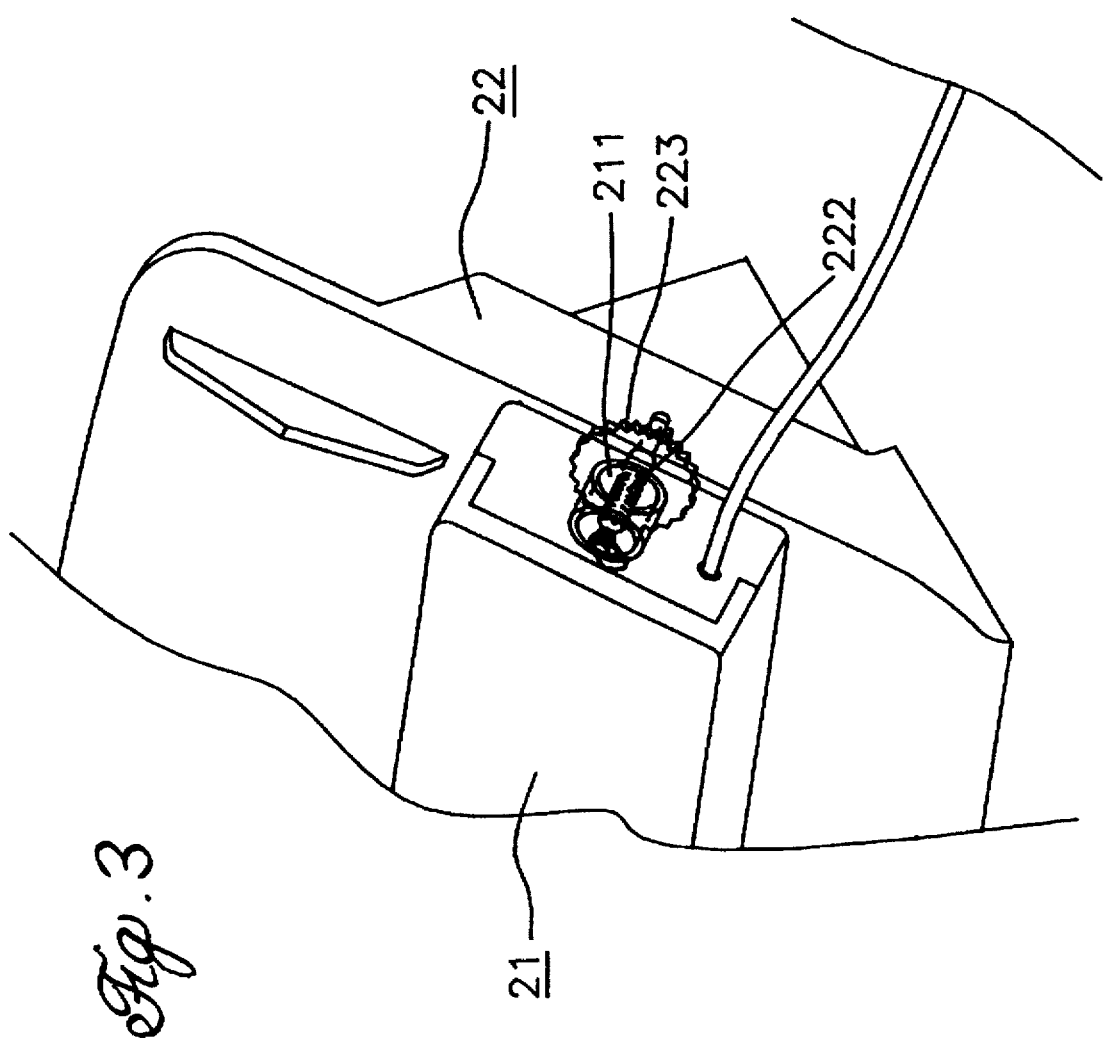
FIG. 3 is a partly enlarged schematic diagram illustratively showing the engagement of an image scanner with a sheet feeder according to the present invention.

In a preferred embodiment, the image scanner 21 can be attached on the sloping plane 221 of the present sheet feeder 22 by way of screwing. The screwing manner is as shown in FIG. 3. There is a conductive screw 222 in the sheet feeder 22 screwed to a conductive threaded hollow cylinder 211 in the image scanner 21 for connecting the sheet feeder 21 and the image scanner 22. The sheet feeder 22 further includes a screwing disk 223 for assisting in the engagement of the conductive screw 222 with the conductive threaded hollow cylinder 211 by spining the screwing disk 223. In an alternative preferred embodiment, as schematically illustrated in block form at 260 in FIG. 2, the image scanner 21 is fixed onto the sheet feeder 22 by snap-locking.

To sum up, the present invention utilizes an improvement on a sheet feeder structure to make the sheet feeder more pragmatic.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet feeder for use with a detachable image scanner, the sheet feeder comprising:

a base portion for supporting the sheet feeder on a horizontal support surface, a sloping support side, extending between an opposite input end and an output end thereof, along which a sheet to be scanned by such image scanner slides as such sheet moves in sequence over an input zone, past such image scanner and over an output zone, where the zones are on the sloping support side, the sloping support side being located on an opposite side of the sheet feeder from the base portion and oriented so that the sloping support side faces upward and slopes relative to such support surface on which the base portion is supported to facilitate ease of access by a user to both the input zone and output zone of the sloping support side, and a mounting for detachably connecting the image scanner to the sheet feeder, transverse thereto, between the input end and output end to enable such sheet to pass between such image scanner and the sheet feeder as such sheet slides from the input zone to the output zone, the output zone of the sloping support side, over which such sheet slides after passing such connected image scanner extending to the output end of the sloping support side, said output end being positioned on the sheet feeder at a location adjacent to such support surface when the sheet feeder is supported thereon by the base portion, the output zone of the sloping support side comprising a concave curved portion at the output end and the output end being open to thereby provide ease of movement for such sheet sliding from the output zone passed the output end onto such support surface.

2. The sheet feeder of claim 1 wherein the input zone and the portion of the output zone towards the input end from the curved portion over which such sheet slides are in a common plane.

3. The sheet feeder of claim 1 wherein the mounting comprises a screw for attaching such image scanner to the sheet feeder.

4. The sheet feeder of claim 1 comprising a plate providing the sloping support side.

5. The sheet feeder of claim 4 wherein the mounting comprises a screw for attaching such image scanner to the sheet feeder.

6. The sheet feeder of claim 1 wherein the mounting comprises a snap-lock for attaching such image scanner to the sheet feeder.

7. The sheet feeder of claim 1 comprising a guide on each of opposite transverse sides of the input zone along which the sheet slides to assist in straight advancing of each sheet passed such image scanner.

* * * * *

UNITED STATES PATENT AND TRADEMARK OFFICE
CERTIFICATE OF CORRECTION

PATENT NO. : 5,711,516
DATED : January 27, 1998
INVENTOR(S) : Ampere Pan

It is certified that error appears in the above-indentified patent and that said Letters Patent is hereby corrected as shown below:

Column 1, line 13, change "there on" to -- thereon --.
Column 1, line 62, change "DRAWING" to -- DRAWINGS --.
Column 2, line 59, change "assisting" to -- assist --.
Column 3, line 2, change "fictional" to -- frictional --.
Column 3, line 37, change "along which" to -- along with --.
Column 4, line 21, change "passed" to -- past --.
Column 4, line 41, change "passed" to -- past --.

Signed and Sealed this

Thirteenth Day of April, 1999

*Attest:*

Q. TODD DICKINSON

*Attesting Officer*     *Acting Commissioner of Patents and Trademarks*